US008630610B2

(12) United States Patent
Shaffer et al.

(10) Patent No.: US 8,630,610 B2
(45) Date of Patent: Jan. 14, 2014

(54) CALL TO CALL CENTER AS TRIGGER TO CAPTURE AND RECORD OTHER GEOGRAPHICALLY RELEVANT DATA

(75) Inventors: Shmuel Shaffer, Palo Alto, CA (US); Jochen Weppner, Belmont, CA (US); Shantanu Sarkar, San Jose, CA (US); Mukul Jain, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 285 days.

(21) Appl. No.: 12/845,183

(22) Filed: Jul. 28, 2010

(65) Prior Publication Data

US 2012/0027189 A1 Feb. 2, 2012

(51) Int. Cl.
*H04M 11/04* (2006.01)
(52) U.S. Cl.
USPC .................................................. 455/404.2
(58) Field of Classification Search
USPC .................. 455/445, 456.1, 404.1, 404.2
See application file for complete search history.

(56) References Cited

U.S. PATENT DOCUMENTS

| 6,754,335 | B1 | 6/2004 | Shaffer et al. |
| 7,831,270 | B2 | 11/2010 | Kalley et al. |
| 2003/0054837 | A1* | 3/2003 | Ennis ............................ 455/456 |
| 2007/0036118 | A1 | 2/2007 | Shaffer et al. |
| 2007/0202908 | A1 | 8/2007 | Shaffer et al. |
| 2008/0037762 | A1 | 2/2008 | Shaffer et al. |
| 2008/0037763 | A1 | 2/2008 | Shaffer et al. |
| 2008/0043933 | A1* | 2/2008 | Pinault et al. .................. 379/45 |
| 2008/0280637 | A1 | 11/2008 | Shaffer et al. |
| 2009/0143047 | A1* | 6/2009 | Hays et al. ................. 455/404.2 |

\* cited by examiner

*Primary Examiner* — Temica M Beamer
*Assistant Examiner* — Joel Ajayi
(74) *Attorney, Agent, or Firm* — Edell, Shapiro & Finnan, LLC

(57) ABSTRACT

Techniques are provided for using a location of a caller placing a call that is received at a call center to identify other sources of information that are relevant to the call. A call is received at a call center from a caller. The location of the caller is obtained from the received call, and other sources of information potentially relevant to the call are identified based on the location of the caller. For example, information is stored that identifies at lease one individual that is proximate to the location of the caller, and communication is initiated with at least one individual who is determined to be located proximate to the caller.

20 Claims, 7 Drawing Sheets

CALL TO CALL CENTER AS TRIGGER TO CAPTURE AND RECORD OTHER GEOGRAPHICALLY RELEVANT DATA

TECHNICAL FIELD

The present disclosure relates to communication networks and to techniques for determining geographically relevant information for calls made to call center.

BACKGROUND

Calls to a call center during emergency situations sometimes have limited utility due to the inability of the caller to fully convey the circumstances of the situation or emergency that is being reported. Additionally, a caller placing an emergency call may not know or have access to complete information that could be useful for responders to the emergency.

However, relevant data about the purpose of the call may be available by leveraging the location of the caller and using other sources of geographically relevant information.

DESCRIPTION OF EXAMPLE EMBODIMENTS

Overview

A method is provided for capturing and recording data where, at a call center, a call is received from a caller, and a location of the caller is obtained from the received call. Other sources of information potentially relevant to the call are identified based on the location of the caller, and information is stored that identifies at least one individual that is proximate to the location of the caller. Communication is also initiated with at least one individual who is determined to be proximate to the caller.

Example Embodiments

Figure 1:
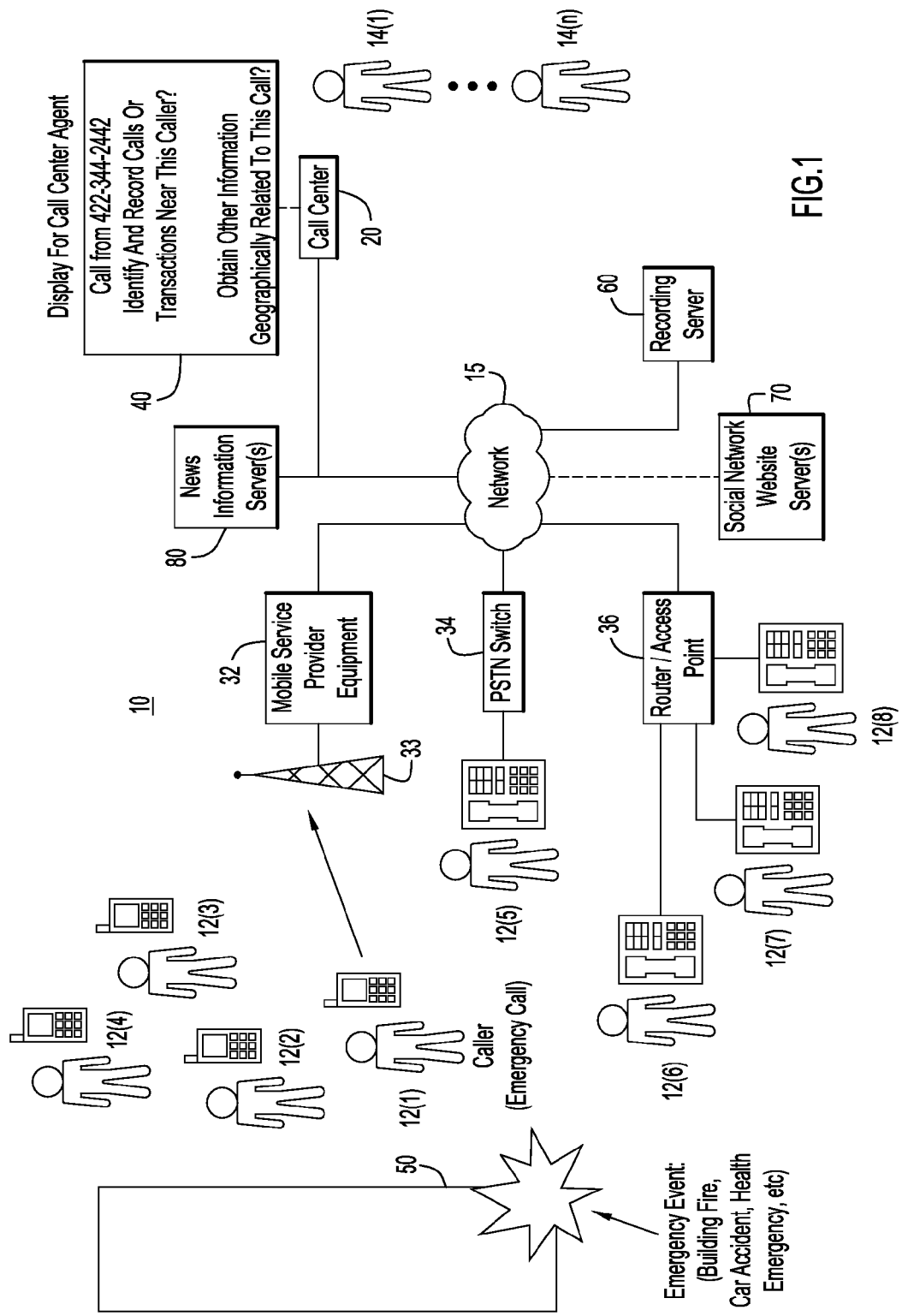
FIG. 1 is an example of a communication system in which additional geographically relevant information related to a call to a call center is automatically identified and retrieved.

Referring first to FIG. 1, an example is shown of a communication system 10 in which a plurality of users shown at reference numerals 12(1)-12(8) are associated with a communication device that is capable of placing calls to a call center 20. The call center 20 receives and handles the calls from the users and, as described herein, may initiate calls to certain users to seek additional information that may be relevant to a call received for a particular user. The term "caller" is used herein to refer to a user who places a call to the call center 20. There are call center personnel or agents shown at 14(1)-14(n) at the call center 20 that handle incoming calls to the call center 20.

Users may place calls to the call center 20 in different ways depending on the nature of their associated communication device. The call center 20 is connected to a network 15 (e.g., the Internet, a local area network (LAN), a public switching telephone network (PSTN), etc.) and intermediate infrastructure equipment is connected to the network 15 to direct calls from users to the call center 20. In FIG. 1, user 12(1) is a wireless mobile communication device user who places a call to the call center 20 through mobile service provider equipment 32 via a base station tower 33. Users 12(2)-12(4) are also wireless mobile communication device users and they can receive and initiation communication via the mobile service provider equipment 32.

User 12(5) is an example of landline user that has a standard landline telephone device that connects to a public switched telephone network (PSTN) switch 34 which is in turn connected to the network 15. Users 12(6)-12(8) are examples of landline users that have Internet Protocol (IP) telephones connected to a router/access point 36 by a wired or wireless connection and the router/access point 36 is in turn connected to the network 15. Thus, any of the users 12(1)-12(8) may initiate communication with the call center 20 or conversely may respond to or accept communication initiated by the call center 20, as described further hereinafter. Furthermore, an individual call center agent is provided with a display 40 on which information about a received call is displayed to the call center agent. Examples of this information are described further hereinafter.

In the example shown in FIG. 1, user 12(1) is witnessing an emergency event shown at reference numeral 50, such as a building fire, car accident, health emergency, etc. User 12(1) places a call to the call center 20, which in this example, serves as a "911" or emergency response call center. The user 12(1) thereby becomes a caller with respect to a call he/she places to the call center. Similarly, users 12(2)-12(4), who are located proximate the caller 12(1), may place a call to the call center 20. Likewise, users 12(5)-12(8) may place landline calls to the call center 20 or receive calls from the call center 20.

When an emergency event, such as event 50, occurs, there may be numerous sources of geographically relevant information that can be obtained by the call center 20 when the call center 20 receives a call about the emergency event. Calls and other communication sessions involving the call center 20 are recorded by a recording server 60. Furthermore, as described hereinafter, the call center 20 may obtain geographically relevant information about the emergency event from social network website server(s) shown at 70, such as servers for Twitter™, Facebook™, MySpace™, and other web-based social networking services, etc. Similarly, the call center 20 may access other information from a news information server 80 to obtain weather conditions, traffic conditions, news information, etc., for a particular geographical area of interest.

The call center 20 is configured to identify and record information, if available, from other sources that may be relevant (based on their geographical proximity) to a call from a given caller, e.g., caller 12(1), in connection with an emergency event. The display 40 graphically displays the location of a caller and in some cases, the locations of other callers that may have information relevant to an event. For example, a message is displayed on the display 40 to a caller center with the phone number of caller 12(1) "422-233-2442" and a message prompting the call center agent with an option of identifying and recording calls or transactions near the caller 12(1), or obtaining information geographically related to the call from caller 12(1). More specific examples of techniques for obtaining additional information related to an incoming call to the call center 20 are described hereinafter in connection with FIGS. 3-6.

Figure 2:
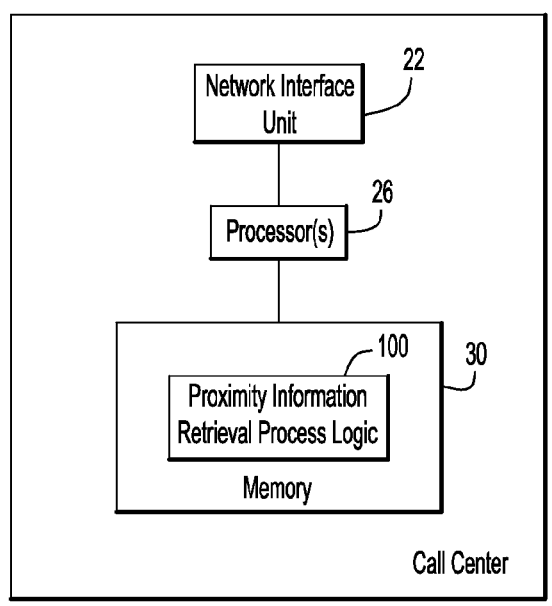
FIG. 2 is an example of a block diagram of a call center configured to identify and retrieve additional geographically relevant information related to an incoming call.

Reference is now made to FIG. 2. FIG. 2 shows a block diagram of the call center 20. The call center 20 comprises a network interface unit 22, processor 26, and a memory 30. The memory is, for example, random access memory (RAM) but may also comprise electrically erasable programmable read only memory (EEPROM), particularly for storage of software information, or any other suitable memory. The network interface unit 22 is configured to receive one or more calls or other potentially relevant information over the network 15 in FIG. 1 and also to send communications over the network 15 to one or more sources of potentially relevant information, e.g., social network server 70, to retrieve additional information related to the call. The network interface unit 22 is also configured to initiate communications (calls) from the call center 20 to one or more individuals (users) that are located near a call that is received by the call center 20. The processor 26 is configured to execute instructions stored in memory 30 for carrying out the various operations described herein. In particular, the processor 26 is configured to execute software program logic instructions stored in memory 30 including proximity information retrieval process logic 100. Generally, the proximity information retrieval process logic 100 is configured to cause the processor to receive a call from a caller, obtain a location of the caller from the received call and to identify other sources of information potentially relevant to the call based on the location of the caller.

The operations of processor 26 may be implemented by logic encoded in one or more tangible media (e.g. embedded logic such as an application specific integrated, digital signal processor instructions, software that is executed by a processor, etc), wherein memory 30 stores data used for the operations described herein and stores software or processor executable instructions that are executed to carryout the operations described herein. The proximity information retrieval process logic 100 may take any of a variety of forms, so as to be encoded in one or more tangible media for execution, such as fixed logic or programmable logic (e.g., software/computer instructions executed by a processor) and the processor 26 may be an application specific integrated circuit (ASIC) that comprises fixed digital logic, or a combination thereof. For example, the processor 26 may be embodied by digital logic gates in a fixed or programmable digital logic integrated circuit, which digital logic gates are configured to perform the operations for the proximity information retrieval process logic 100. In one form, the proximity information retrieval process logic 100 may be embodied in a processor or computer-readable memory medium (memory 30) that is encoded with instructions for execution by a processor (e.g. processor 26) that, when executed by the processor, are operable to cause the processor to perform the operations described herein in connection with the proximity information retrieval process logic 100.

Figure 3:
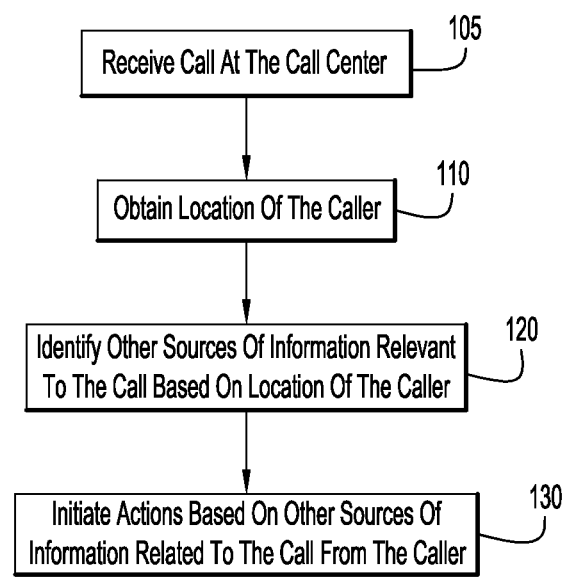
FIG. 3 is an example of a flow chart depicting operations of the proximity information retrieval process logic executed in the call center device for determining a location of a caller and initiating actions to obtain geographically relevant information about the call based on the location of the caller.

Reference is now made to FIG. 3. FIG. 3 shows the operations performed by the proximity information retrieval process logic 100. At 105, the call center 20 receives a call placed by a caller, e.g., caller 12(1) shown in FIG. 1. The processor 26, at 110, then obtains the location of the caller. The location of the caller may be obtained, for example, by global positioning system (GPS) technology, enhanced 911 (E911) technology that automatically associates a location to a caller's emergency call, wireless triangulation technology, or other similar location detection methods. At 120, the processor 26 identifies other sources of information that are relevant to the call based on the location of the caller. For example, the processor 26 may identify other individuals that are near the caller 12(1), such as users 12(2)-12(8) from postings made to a social network website 70, for example. In another example, the processor 26 may identify other information, such as time of day, weather conditions, surrounding traffic conditions, locations of individuals in a call center queue, local news information related to the geographical area of the caller 12(1), etc., based on the location of the caller 12(1). Additionally, the location of the other individuals may be determined by analyzing email or mobile phone service provider information to obtain embedded geolocation information or triangulation information that indicates the location of the other individuals or users. At 130, the processor 26 may initiate one or more actions based on the other sources of information that are related to the call as determined at 120.

Figure 4:
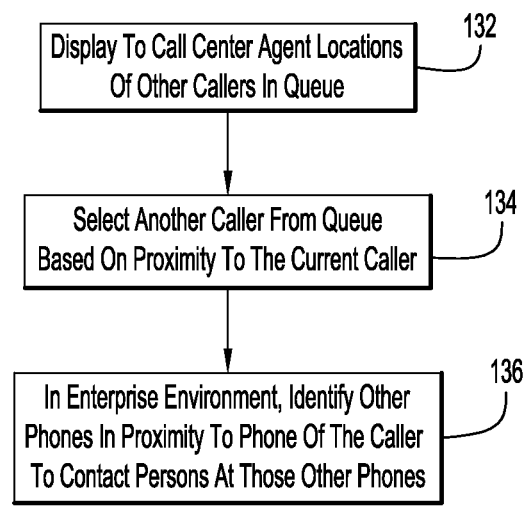
FIG. 4 is an example of a flow chart showing actions that the call center initiates to obtain additional geographically relevant information for a call.
Figure 5:
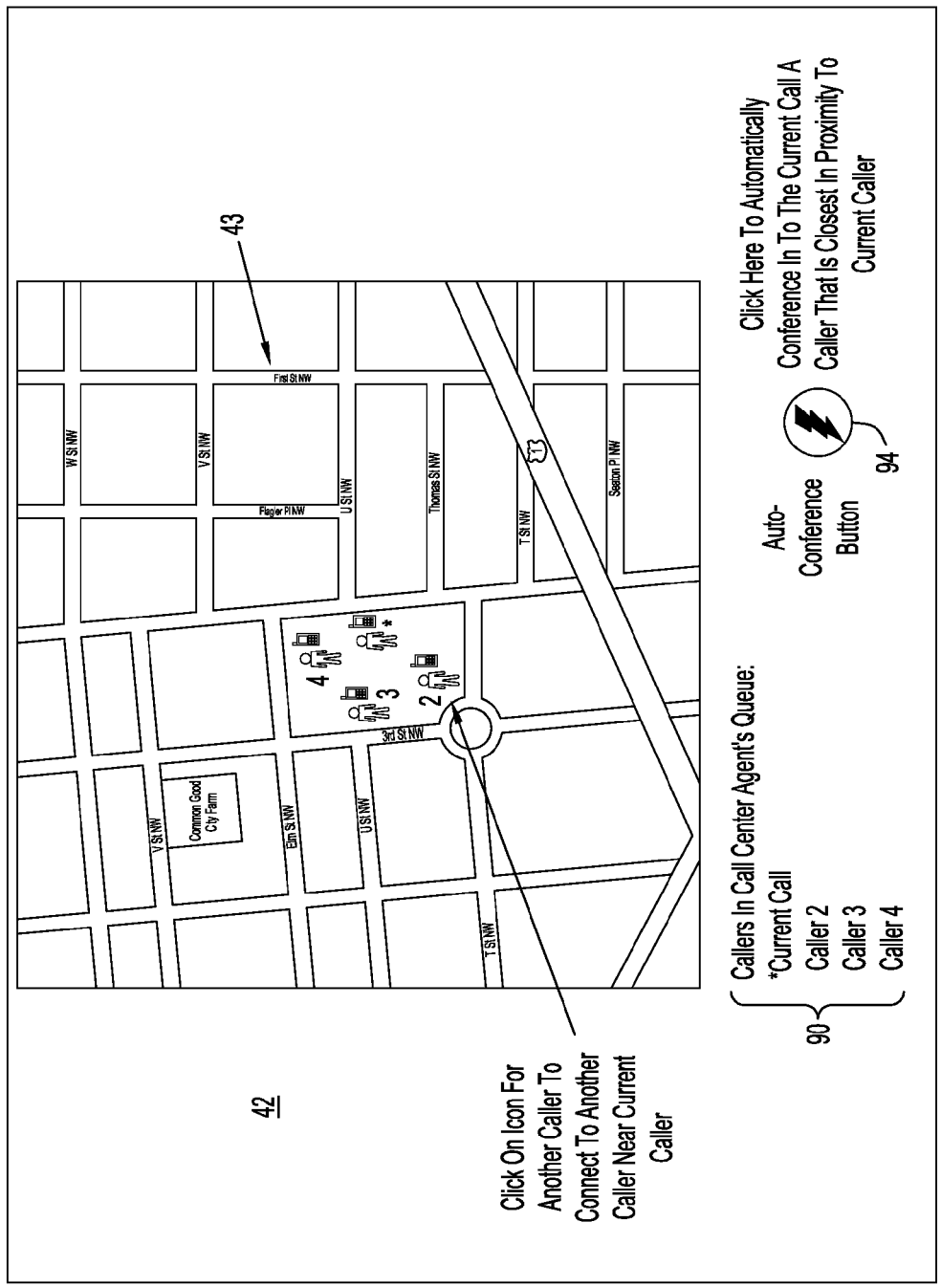
FIG. 5 is an example of an image on a graphical user interface at the call center that displays geographic locations of several callers in a call center queue along with options that allow a call center agent to initiate communication actions.

Reference is now made to FIGS. 4 and 5. FIG. 4 is an example of a flow chart depicting specific examples of operations 120 and 130 to identify sources of information relevant to the call based on the location of the caller 12(1) and to initiate actions based on the sources of information. Any one or more of the specific examples may be performed at the call center 20 by one or more call center agents (for example, agent 14(1)). FIG. 5 shows an example of a user interface screen 42 displayed to a call center agent. The screen 42 shows a location of the caller, denoted by the *, on a map 43 of the locality of the caller. The screen 42 also shows callers 2, 3 and 4 and their relative locations to the current caller. Callers 2, 3 and 4 are examples of other callers that may have called in to the call center 20 perhaps to report the same emergency event that the current caller (*) called to report or may be examples of callers that have been identified to be in the proximity of the current caller (*) by a variety of means (such as by the social network website server 70, location information from the mobile service provider 32, etc.).

At 132, the locations of other callers in a call center queue are displayed on the map of the screen 40 to a call center agent. In FIG. 5, a call center queue 90 is shown comprising callers 2, 3, and 4 along with a current caller (i.e. caller 12(1)). The locations of callers 2, 3, and 4 relative to the current caller are displayed to the call center agent as icons labeled 2, 3 and 4 on the map 43 of display screen 42. At 134, the call center agent may select another caller in the call center queue 90 based on the proximity of that caller to the current caller. The call center agent may perform operation 134 by clicking on a mouse on the icon for a caller (e.g., icon for caller 2, 3 or 4) displayed on the screen 42 in order to connect to that caller. For example, a call center agent may select and accept the call from caller 2, based on his or her proximity to the current caller, by clicking on the icon for caller 2 in the map 43 of the display screen 42. Operation 134 may also be performed by the call center agent automatically select a caller in the call center queue that is closest to the current caller and to conference in that caller to the current call. This action is initiated by clicking a button 94 on the screen 42, for example. At 136, a call center agent may also identify other phones that are in proximity to caller 12(1) in order to contact persons near those other phones. For example, in an enterprise environment, the location of each phone, such as an IP phone (shown at 12(6)-12(8) in FIG. 1) is known a priori. It should be noted that, in one example, the locations of users 12(6)-12(8) may be displayed on screen 42 as well. The call center agent may contact user 12(6) located near caller 12(1), by placing a call to the phone for user 12(6) as shown in FIG. 1. This latter operation is particularly useful in the event that an emergency event is reported by a caller from an enterprise phone and it is determined that other enterprise phones are located near the phone from which the caller has placed a call to the call center 20.

Figure 6:
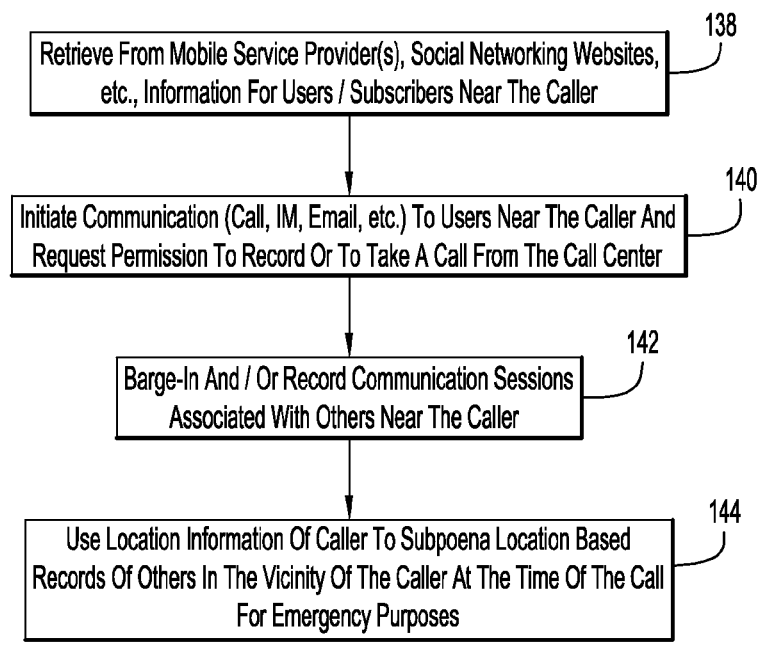
FIG. 6 is an example of a flow chart showing further actions that the call center initiates to obtain additional geographically relevant information for a call.
Figure 7:
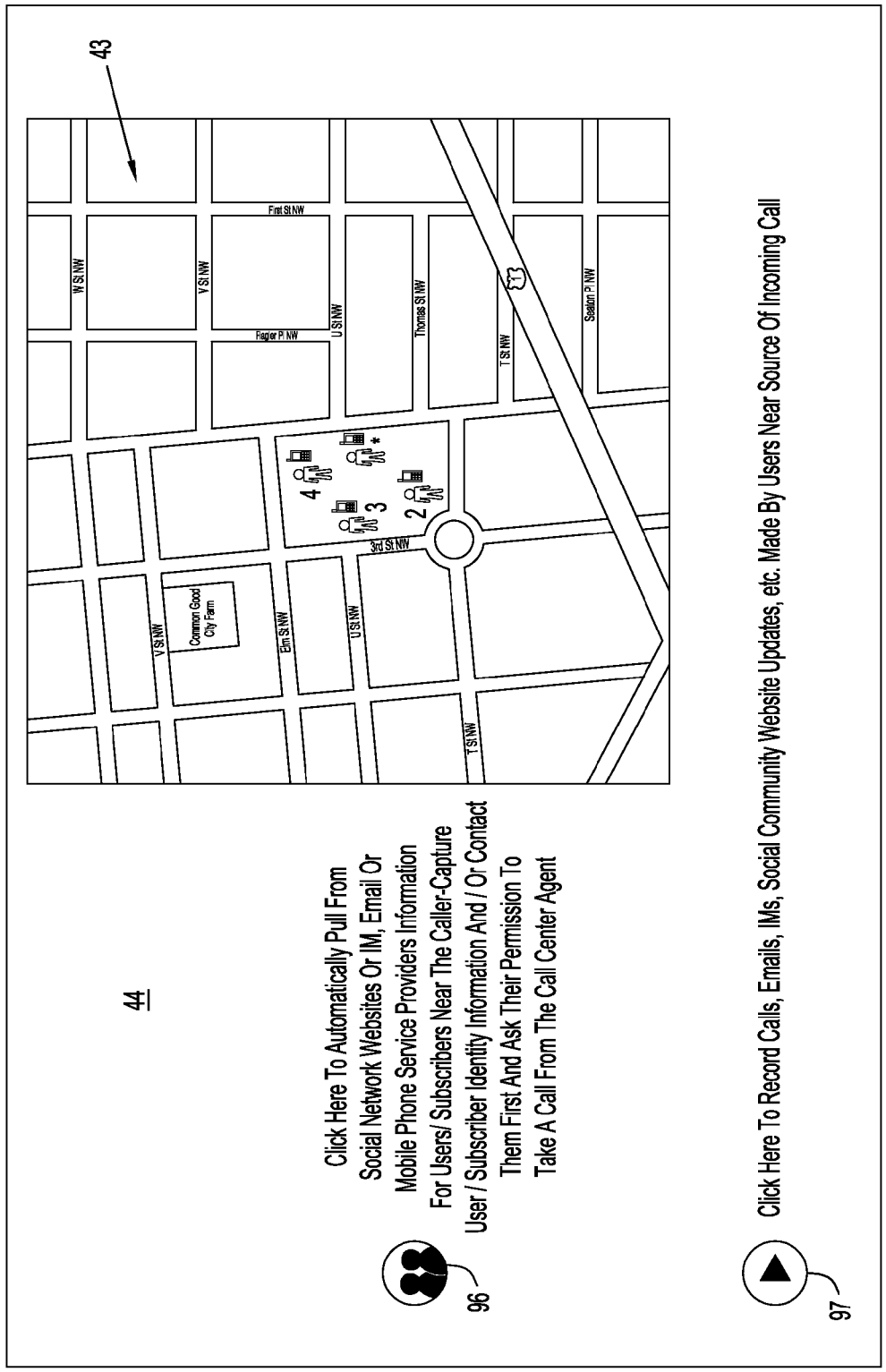
FIG. 7 is an example of an image on a graphical user interface at the call center that displays geographic locations of several individuals located near a caller to a call center along with options that allow a call center agent to initiate communication actions.

Reference is now made to FIGS. 6 and 7 for additional examples of operations 120 and 130 to identify sources of information relevant to the call based on the location of the caller 12(1) and to initiate actions based on the sources of information. These actions may be performed at the call center 20 by one or more call center agents. FIG. 7 illustrates an example of another display screen 44 that includes a map 43 of the area where the current caller denoted by the * is located and the locations of other persons who may have information relevant to the emergency event.

At 138, a call center agent may initiate a command at the call center 20 to retrieve information from mobile service providers, social networking websites, and other sources relevant to users/subscribers currently located near the caller 12(1). This operation may be initiated by the call center agent clicking on a button 96 shown in FIG. 7. For example, the call center 20 may communicate with the mobile service provider 32 shown in FIG. 1 to obtain information about users in the mobile service provider's network that are located near the caller 12(1). The mobile service provider 32 knows the locations of its users based on the base stations that the users are associated with. Similarly, the call center 20 may communicate with one or more social networking websites shown at 70 in FIG. 1 to obtain information (feeds) about postings made from users/subscribers that are perhaps located near the caller 12(1) and may be able to provide additional information regarding the same emergency event that caller 12(1) is witnessing. The call center 20 may display icons for the locations of these users as shown by the icons for users 5, 6 and 7 in FIG. 7. In addition, the identities or the contact information (e.g., phone numbers, subscriber/user account names, texting addresses, etc.) for these users are also provided to the call center 20. Using the information about other persons that are determined to be located near the caller, the call center agent may take one of several actions. In addition, information identifying at least one user (individual) obtained at 138 is stored (associated with a recording of the call from the caller 12(1)) for subsequent use. For example, identities associated with at least one user (individual) may be obtained from the information at 138 and may be stored along with the recording of the call from the caller 12(1) for use at a later time (e.g., for forensic use in obtaining additional information about an event that occurred in the past, etc.).

At 140, an agent at call center 20 may initiate communications to these nearby users and to request permission or consent to accept a call from the call center 20. For example, in FIG. 7 the call center agent may click on an icon for a user, e.g., icon for user 5, to initiate contact to that user either by a phone call, email, instant message (IM), text message, etc. The purpose of this initial contact is, again, to request permission to talk to that user to obtain additional information from that user relevant to the emergency reported by caller 12(1). When the user grants permission to the call center agent, then the call center 20 can establish or proceed with a call to the nearby user so that the call center agent may speak to the nearby user. If the nearby user denies permission for the call center to call the nearby user, then the call center will not call the nearby user. Or, the call center 20 may engage in non-telephone communications with the nearby user such as by IM, text message, social website postings, etc., to obtain information from the user about the emergency event. It should be understood that the operations described above may be repeated for any other user in the vicinity of the first caller.

However, at 142, a call center agent may, with proper legal authority and without consent of the individuals involved in a call, barge-in to listen and record communication sessions with the users near caller 12(1) in an attempt to obtain additional information relevant to the emergency event. For example, a call center agent may click on button 97 in FIG. 7 to listen and record calls, emails, IMs, social community website updates, etc. of the users near caller 12(1).

At 144, the call center agent may use location information of caller 12(1) to initiate procedures to subpoena location based records of others in the vicinity of the caller 12(1) at the time of the call. For example, the call center agent may use the location information to monitor and record communications (e.g., calls, text messages, emails, etc.) made by an individual in the vicinity of caller 12(1) to a third party who may not be in the vicinity of the caller 12(1).

All of the information obtained by operations 132-144, as well as all the information described in connection with FIGS. 5-7 may be captured and stored, together with the recording of the call from the caller (in operation 105 of FIG. 1), by the recording server 60 shown in FIG. 1.

In sum, a method is provided in which a call is received at a call center, a location of the caller is obtained from the received call, and other sources of information potentially relevant to the call are identified based on the location of the caller. Similarly, a computer-readable memory is provided that stores instructions that, when executed by a processor, cause the processor to receive a call from a caller, to obtain a location of the caller from the received call, and to identify other sources of information potentially relevant to the call based on the location of the caller.

Additionally, an apparatus is provided that comprises a network interface unit that is configured to receive one or more calls over a network and to initiate communications to one or more individuals over the network. The apparatus also has a processor that is configured to be coupled to the network interface and is configured to obtain a location for a caller placing a call received at the network interface unit and to identify other sources of information potentially relevant to the call based on the location of the call.

The above description is intended by way of example only.

What is claimed is:
1. A method comprising:
   at a call center, receiving a call from a caller, the call pertaining to occurrence of an event for which the caller provides event information to the call center;
   obtaining a location of the caller based on geographic information associated with the call;
   evaluating the event information and the geographic information;
   identifying a plurality of other sources of information, potentially relevant to the event, wherein the other sources of information comprise one or more individuals proximate to the location of the caller and one or more sources of electronically generated information related to the event, based on the event information and the geographic information associated with the caller; and obtaining additional information about the event from one or more of the plurality of other sources of information, wherein obtaining additional information comprises:
   initiating communication with one or more individuals that are proximate to the location of the caller and, as a result of initiating communication, receiving additional information related to the event from the one or more individuals; and
   retrieving additional information generated electronically by individuals that are proximate to the location of the caller.

2. The method of claim 1, wherein retrieving information generated electronically comprises retrieving information in a form of postings made to one or more social networking websites, instant messages, text messages, email, or from news information servers.

3. The method of claim 2, wherein retrieving information generated electronically further comprises obtaining information from a mobile communication service provider to obtain information that indicates locations of other users that are located near the caller.

4. The method of claim 1, further comprising storing information identifying at least one individual that is proximate to the location of the caller in association with a recording of the call from the caller.

5. The method of claim 1, further comprising engaging in a communication session with the one or more individuals that are proximate to the location of the caller in response to receiving consent from the one or more individuals to conduct the communication session.

6. The method of claim 1, wherein initiating communication further comprises initiating a call, text message or instant message to the one or more individuals who are proximate to the location of the caller.

7. The method of claim 1, wherein identifying further comprises determining locations of other callers associated with other calls in a queue to the call center, and displaying on a graphical user interface screen the location for each of the other callers in the queue with respect to the location of the caller.

8. The method of claim 7, further comprising selecting a call from at least one other caller in the queue based on proximity to the location of the caller.

9. The method of claim 1, further comprising storing an identity of the caller and recording of the call from the caller.

10. The method of claim 1, further comprising storing identities of other sources of information and additional information related to the event for subsequent analysis.

11. The method of claim 1, further comprising initiating communication with at least one individual determined to be proximate the location of the caller and recording data related to a communication session involving the at least one individual.

12. A tangible computer-readable memory medium storing instructions that, when executed by a processor, cause the processor to:
   receive a call from a caller, the call pertaining to occurrence of an event for which the caller provides event information to a call center;
   obtain a location of the caller based on geographic information associated with the call;
   evaluate the event information and the geographic information in the call;
   identify a plurality of other sources of information potentially relevant to the event, wherein the other sources of information comprise one or more individuals proximate to the location of the caller and one or more sources of electronically generated information related to the event, based on the event information and the geographic information associated with the caller; and
   obtain additional information about the event from one or more of the plurality of other sources of information, by (i) initiating communication with one or more individuals that are proximate to the location of the caller and, as a result of initiating communication, receiving additional information related to the event from the one or more individuals, and (ii) retrieving additional information generated electronically by individuals that are proximate to the location of the caller.

13. The tangible computer-readable memory medium of claim 12, further comprising instructions that cause the processor to store information identifying the at least one individual in association with a recording of the call from the caller.

14. The tangible computer-readable memory medium of claim 12, wherein the instructions that cause the processor to retrieve information generated electronically further comprise instructions that cause the processor to obtain information from a mobile communication service provider to obtain information that indicates the locations of other users that are located near the caller.

15. The tangible computer-readable memory medium of claim 12, wherein the instructions that cause the processor to retrieve information generated electronically comprise instructions that cause the processor to obtain information in a form of postings made to one or more social networking websites, instant messages, text messages, email, or from news information servers.

16. The tangible computer-readable memory medium of claim 12, wherein the instructions that cause the processor to identify further comprise instructions that cause the processor to determine locations of other callers associated with other calls in a queue to the call center, and displaying on a graphical user interface screen the location for each of the other callers in the queue with respect to the location of the caller.

17. An apparatus comprising:
   a network interface unit configured to receive from a caller a call over a network and configured to initiate communications to one or more communication devices, wherein the call pertains to occurrence of an event for which the caller provides event information to a call center; and
   a processor configured to be coupled to the network interface unit, wherein the processor is configured to:
      obtain a location of the caller based on geographic information associated with the call;
      evaluate the event information and the geographic information in the call;
      identify a plurality of other sources of information potentially relevant to the event, wherein the other sources of information comprise one or more individuals proximate to the location of the caller and one or more sources of electronically generated information related to the event, based on the event information and the geographic information associated with the caller; and
      obtain additional information about the event from one or more of the plurality of other sources of information, by (i) initiating communication with one or more individuals that are proximate to the location of the caller and, as a result of initiating communication, receiving additional information related to the event from the one or more individuals, and (ii) retrieving additional information generated electronically by individuals that are proximate to the location of the caller.

18. The apparatus of claim 17, wherein the processor is configured to store information identifying the at least one individual in association with a recording of the call from the caller.

19. The apparatus of claim 17, wherein the processor is further configured to obtain information from a mobile communication service provider to obtain information that indicates locations of other users that are located near the caller.

20. The apparatus of claim 17, wherein the processor is further configured to determine locations of other callers associated with other calls in a queue to the call center and to generate data to display on a graphical user interface screen the location for each of the other callers in the queue with respect to the location of the caller.

* * * * *